United States Patent
Cordero et al.

(10) Patent No.: US 9,740,267 B1
(45) Date of Patent: Aug. 22, 2017

(54) ADJUSTING POWER MANAGEMENT CONTROLS OF A MEMORY BASED ON TRAFFIC

(71) Applicant: International Business Machines Corporation, Armonk, NY (US)

(72) Inventors: Edgar R. Cordero, Round Rock, TX (US); Briana E. Foxworth, Round Rock, TX (US); Kevin M. Mcilvain, Delmar, NY (US); Lucas W. Mulkey, Austin, TX (US); Feihong Yan, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/338,844

(22) Filed: Oct. 31, 2016

(51) Int. Cl.
*G06F 1/32* (2006.01)
(52) U.S. Cl.
CPC .......... *G06F 1/3206* (2013.01); *G06F 1/3225* (2013.01); *G06F 1/3275* (2013.01)
(58) Field of Classification Search
CPC ..... G06F 1/3206; G06F 1/3225; G06F 1/3275
See application file for complete search history.

(56) References Cited

U.S. PATENT DOCUMENTS

| | | | |
|---|---|---|---|
| 5,884,088 A | 3/1999 | Karcach et al. | |
| 6,584,571 B1 | 6/2003 | Fung | |
| 7,644,293 B2 | 1/2010 | Sistla et al. | |
| 7,739,526 B2 | 6/2010 | Kark et al. | |
| 7,840,820 B2 * | 11/2010 | Shimada | G06F 1/3221 360/31 |
| 8,069,355 B2 | 11/2011 | Simeral et al. | |
| 8,095,818 B2 | 1/2012 | Jorgenson et al. | |
| 8,185,753 B2 | 5/2012 | Oe et al. | |
| 8,286,018 B2 | 10/2012 | Chang et al. | |
| 8,305,839 B2 | 11/2012 | Tsern et al. | |
| 8,365,001 B2 | 1/2013 | Ma | |
| 8,595,522 B2 | 11/2013 | Cooper et al. | |
| 8,756,442 B2 * | 6/2014 | Naffziger | G06F 1/324 713/300 |
| 8,799,685 B2 | 8/2014 | Sadowski et al. | |
| 2005/0081002 A1 * | 4/2005 | Chang | G06F 1/3225 711/154 |
| 2010/0275050 A1 * | 10/2010 | Hong | G06F 1/266 713/324 |
| 2015/0185797 A1 | 7/2015 | Cooper et al. | |
| 2015/0331473 A1 | 11/2015 | Jreji et al. | |

* cited by examiner

*Primary Examiner* — Stefan Stoynov
(74) *Attorney, Agent, or Firm* — Cantor Colburn LLP; Feb R. Cabrasawan

(57) ABSTRACT

An aspect includes viewing contents of a command queue that contains commands waiting to be sent in a specified order to a memory for execution at the memory. Command pattern data that includes patterns of commands and associated estimated power consumptions is accessed. The contents of the command queue are searched for the patterns of commands. One of the patterns of commands is located in the contents of the command queue. A suggested power management action is determined for the memory based on the located pattern of commands and its associated estimated power consumption. The suggested power management action is sent to a power control engine of the memory prior to a first command in the located pattern of commands being sent to the memory for execution.

18 Claims, 6 Drawing Sheets

ADJUSTING POWER MANAGEMENT CONTROLS OF A MEMORY BASED ON TRAFFIC

BACKGROUND

The present invention relates to computer memory, and more specifically, to suggesting adjustments to power management controls in a memory based on anticipated traffic at the memory.

SUMMARY

Embodiments include a method, system, and computer program product for adjusting power management controls of a memory based on traffic. A method includes viewing contents of a command queue that contains commands waiting to be sent in a specified order to a memory for execution at the memory. Command pattern data that includes patterns of commands and associated estimated power consumptions is accessed. The contents of the command queue are searched for the patterns of commands. One of the patterns of commands is located in the contents of the command queue. A suggested power management action is determined for the memory based on the located pattern of commands and its associated estimated power consumption. The suggested power management action is sent to a power control engine of the memory prior to a first command in the located pattern of commands being sent to the memory for execution.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
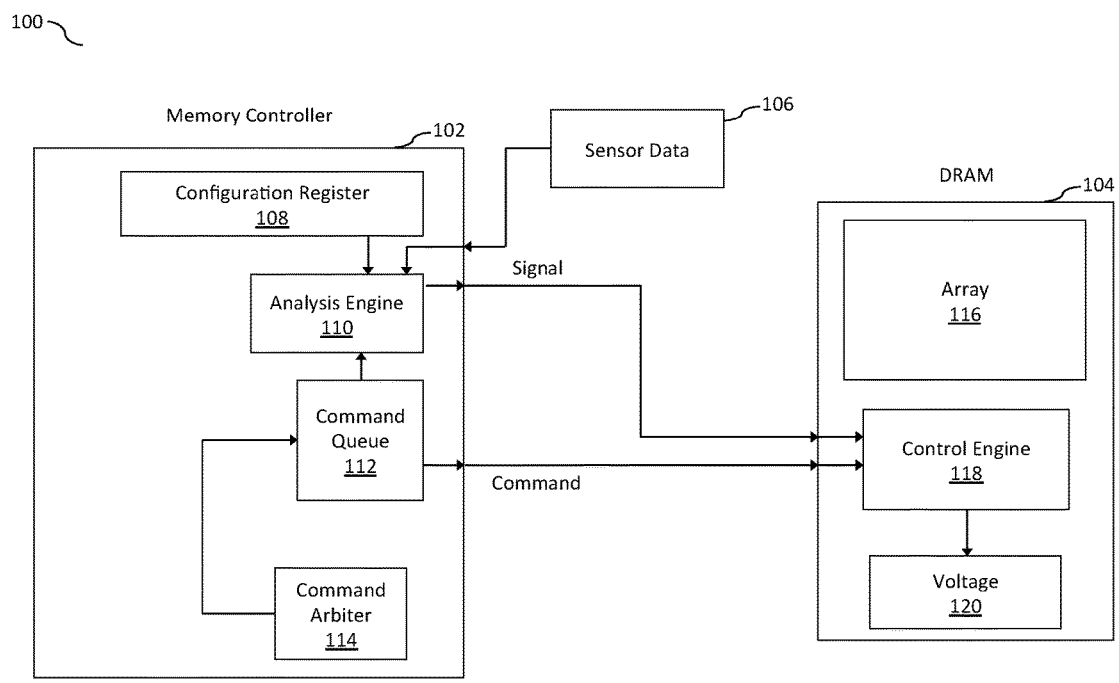
FIG. 1 illustrates a block diagram of components of a memory system for suggesting adjustments to power management controls based on traffic in accordance with one or more embodiments.

Embodiments described herein provide a method for adjusting power management controls of a memory based on expected streams of memory commands and their predicted power consumption when executed at the memory. As used herein, the term memory is used to refer to any device capable of storing data such as, but not limited to a dynamic random access memory (DRAM) device or a flash memory device. One or more embodiments described herein can be utilized to intelligently analyze and/or predict traffic at a memory to determine suggested power management actions for the memory. In accordance with one or more embodiments, signals from a processor or memory controller are used to indicate the status of a command queue and general memory activity. In addition, bus activity between a memory controller and a memory can be decoded and analyzed to predict periods of high or low current draws at a memory. Power control features can be modified in order to balance performance versus power consumption or maintain performance with more optimal power utilization (e.g., reduce peak power by reordering command queues through the use of power usage data). When compared to contemporary methods of power management, one or more embodiments described herein can be utilized to provide a higher level of predicated power consumption accuracy, deeper control over power draw at the memory controller, and the potential of a decrease of thermal output from the memory subsystem.

In accordance with one or more embodiments, a signal is sent to a power control engine of a memory that controls the amount of power (e.g., voltage) that is sent to the memory. When the memory is implemented by a DRAM, the power control engine can be located on the DRAM silica itself, on a DRAM module, on a DRAM dual in-line memory module (DIMM), on the memory system, and/or on a separate application-specific integrated circuit (ASIC). Communication to the power control engine can be achieved either through special commands or a discrete wire, which is referred to herein as a signal.

One or more embodiments analyze commands in a command queue of a memory to determine when a power management signal should be sent to the power control engine of the memory. A signal indicating a suggested power management action might be based, for example, on detecting a buildup of refresh commands. The power control engine reacts to the signal and preemptively accounts for the change in power consumption requirements for the upcoming commands. In accordance with one or more embodiments, bus activity on a bus between a memory controller and a memory is analyzed to determine when to send a signal to the power control engine so that it can react to the power consumption requirements of the upcoming commands.

Power consumption is a major design consideration for modern computers. An optimization of power utilization can achieve or maintain higher performance and limit the need to throttle frequency, bandwidth, or voltage due to power constraints. In many computer systems, DRAMs are a major contributor to the overall power costs of a system, and one or more embodiments described herein provide the ability to add intelligence to the power controls and more accurately regulate power consumption.

Turning now to FIG. 1, a block diagram 100 of components of a memory system for suggesting adjustments to power management controls based on traffic is generally shown in accordance with one or more embodiments. The components shown in FIG. 1 include a memory controller 102, sensor data 106, and a DRAM 104. The memory controller 102 includes a configuration register 108 used to setup and control the operation of the memory controller and associated logic in FIG. 1; a command queue 112 for storing commands in the order that they will be sent to the DRAM 104 for execution; and a command arbiter 114 for loading (and reordering) commands into the command queue 112. As shown in FIG. 1, commands from the command queue 112 are sent on a bus to a control engine 118 in the DRAM 104. The commands can include any type of memory commands from the processor or memory controller such as, but not limited to: read; write; and read-modify-write commands. Also included in the memory controller 102 is an analysis engine 110 for performing at least a subset of the processing described herein. In one or more embodiments, the analysis engine 110 performs the processing described below in reference to FIG. 2 and FIG. 3. The analysis engine 110 outputs a signal that indicates a suggested power management action to the control engine 118 of the DRAM 104.

FIG. 1 also depicts sensor data 106, which is input to the analysis engine 110 on the memory controller 102. In accordance with one or more embodiments, the sensor data 106 is collected from sensors located on the DRAM 104 and measures power consumption of the DRAM 104, however the sensor data 106 is not limited to collecting data from sensors on the DRAM 104, sensor data may be collected from anywhere in a memory system such as on a DIMM or on the memory controller. The DRAM 104 shown in FIG. 1 includes an array 116 which stores data, a control engine 118 for processing commands from the command queue 112 and for adjusting power controls of the DRAM, and a voltage supply 120 for providing power to the DRAM 104. The control engine 118 shown in FIG. 1 is located on the DRAM 104, however the control engine 118 is not limited to being located on the DRAM and can be located anywhere in a memory system such as on a DIMM or on the memory controller 102.

In accordance with one or more embodiments, the signal is sent from the memory controller 102 to the DRAM 104 using a standard interface. This interface may include, but is not limited to: a bus of one or more single ended signals; a bus of one or more differential signals; and encoding of commands onto an existing single ended or differential bus interface. In accordance with one or more embodiments, the power control engine 118 interprets the signal or signals, and manages the memory power. In accordance with one or more embodiments the memory device interprets the signals and passes the power control information to the power control engine 118. Encoded power control information may be sent along existing command, address or data signals to a memory device and decoded by the memory device, memory buffer, or memory controller and passed along, or passed through, to the power control engine 118.

Figure 2:
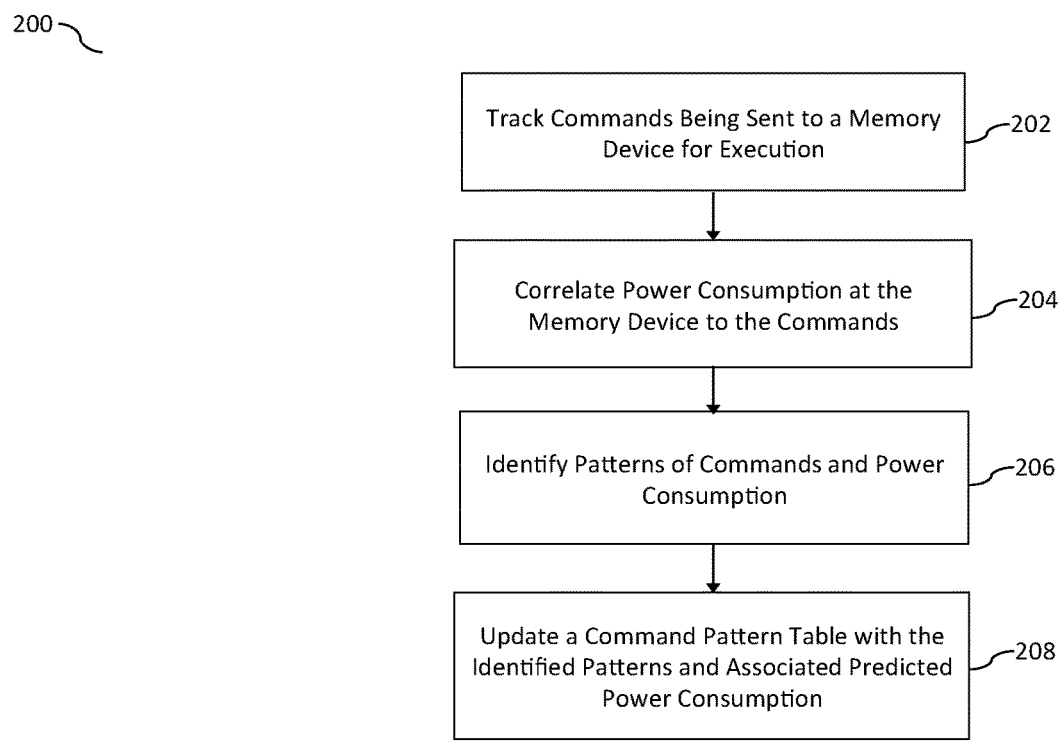
FIG. 2 illustrates a flow diagram of a process for correlating power consumption to patterns of memory commands in accordance with one or more embodiments.

Turning now to FIG. 2, a flow diagram of a process 200 for correlating power consumption at a memory to patterns of memory commands executed at the memory is generally shown in accordance with one or more embodiments. The processing shown in FIG. 2 can be performed by a processor executing the analysis engine 110 shown in FIG. 1. At block 202, commands being sent to a memory (in this example a memory device) for execution are tracked, and at block 204 power consumption at the memory device is correlated to the commands being executed at the memory. In one or more embodiments, sensor data is collected from sensors located on the memory device for measuring power consumption. The correlation can be performed by matching the clock cycles of the command execution and the sensor readings at the memory device. Next, at block 206, patterns of commands and power consumption are identified. For example, a pattern that includes a single write command can correlate to a first power consumption, five consecutive write commands can correlate to a second power consumption, and a pattern of four consecutive read commands can correlate to a third power consumption. At block 208, command pattern data, stored for example in a command pattern table, is updated with the identified patterns and associated measured power consumptions. If one of the patterns of commands is already located in the command pattern data, it can be replaced with the last power consumption reading or an existing value can be combined with the last power consumption reading (e.g., using an average or a weighted average).

Figure 3:
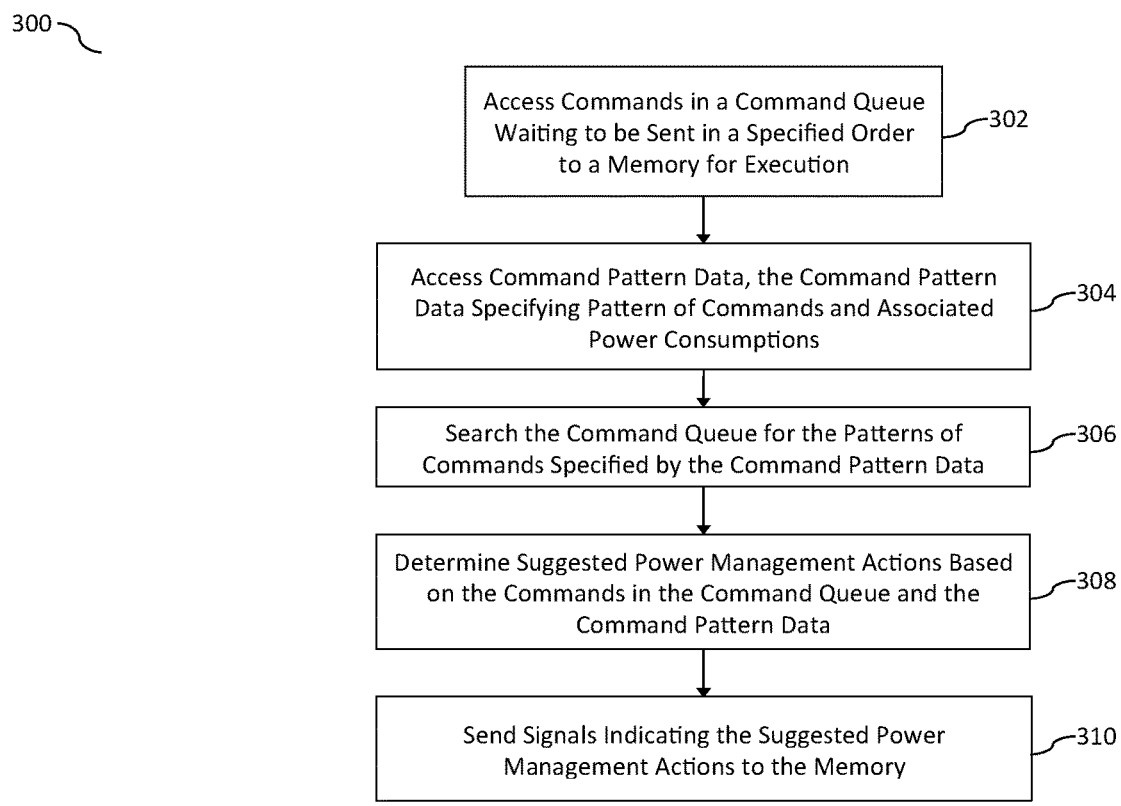
FIG. 3 illustrates a flow diagram of a process for suggesting adjustments to power management controls based on traffic in accordance with one or more embodiments.

Turning now to FIG. 3, a flow diagram of a process 300 for suggesting adjustments to power management controls based on predicted memory traffic is generally shown in accordance with one or more embodiments. The processing shown in FIG. 3 can be performed by a processor executing the analysis engine 110 shown in FIG. 1. At block 302, contents of the command queue 112 are accessed to view commands waiting to be sent in a specified order to a memory for execution at the memory. At block 304, command pattern data that specifies patterns of commands and associated power consumptions of the patterns of commands is accessed. Contents of the command queue are searched for one or more of the patterns specified by the command pattern data at block 306. At block 308, suggested power management actions at the memory are determined based on the patterns of commands in the command queue located by the search and their associated power consumptions as specified by the command pattern data.

At block 310, signals indicating the suggested power management actions are sent to the power control engine. The suggested power management actions can be based on a current power management setting of the memory or on a previously suggested power management action sent to the memory. In one or more embodiments a suggested power management action includes increase the voltage, decrease the voltage, or leave the voltage at its current level. In one or more embodiments the signals are sent prior to (e.g., one or more clock cycles ahead of) a first command in the located pattern being sent from the command queue 112 to the memory in order to give the power control engine time to adjust the voltage supply 120 to the memory before the pattern of commands start executing at the memory.

Figure 4:
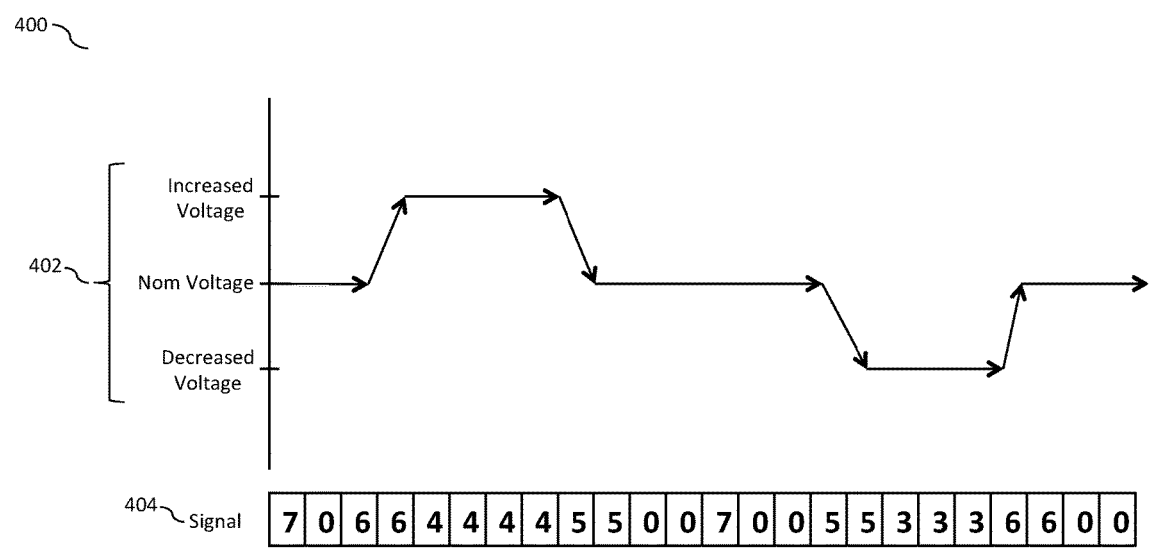
FIG. 4 illustrates a block diagram of power management signals and actions in accordance with one or more embodiments.

Turning now to FIG. 4, a diagram 400 of power management signals and actions taken by a power control of the memory are generally shown in accordance with one or more embodiments. FIG. 4 includes signals 404 with suggested power management actions being sent to the control engine 118 along with resulting power management actions 402 taken by the control engine 118. In the embodiment shown in FIG. 4, each suggested power management action that is sent as a signal to the memory from the analysis engine 110 includes a code selected from the following group: "7" to indicate synchronize to the data stream, which is periodically sent to inform the power control engine of the nominal voltage reference signal state in an embodiment using a single power control signal with varying voltages levels; "6" increasing voltage to indicate increased traffic coming; "5" decreasing voltage to indicate decrease in traffic coming; "4" to indicate staying high traffic; "3" low voltage to indicate staying low traffic; "2" to indicate sleep mode; "1" to indicate RFU reserved mode for future use, a mode whereby the power control engine can be programmed to behave in a desired fashion; and "0" to indicate leave settings at current value.

In one or more embodiments the signal encodings as described herein may be encoded on a single line as a defined voltage level as stated or may be encoded digitally on a multi signal bus or within an existing bus connected to the memory or a memory buffer whereby the encoding may be passed on from the memory to the power control engine. These signals can be sent to the memory 104 on the same clock cycle or any number of prior clock cycles as each command from the command queue 112, and are based on the analysis engine 110 looking ahead in the command queue 112 to determine a predicted power consumption of the upcoming commands. As shown in FIG. 4, the power control engine 118 may react in many ways including increasing voltage, leaving voltage as is, or decreasing voltage based on the value of the signal 404 received from the analysis engine 110.

Figure 5:
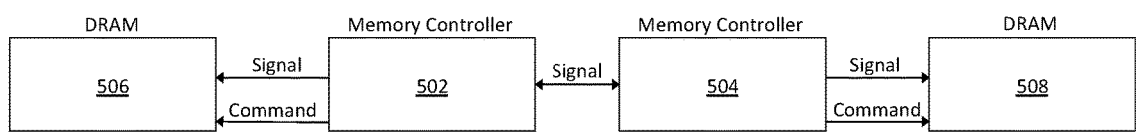
FIG. 5 illustrates a block diagram of components of memory systems sharing power consumption data to perform power management of multiple memory systems in accordance with one or more embodiments.

Turning now to FIG. 5, a block diagram 500 of components of a memory system for suggesting adjustments to power management controls based on traffic is generally shown in accordance with one or more embodiments. The memory system shown in FIG. 5 includes a memory controller 502 connected to a memory 506 via a signal and a command interface, and a memory controller 504 via a signal interface. The memory system shown in FIG. 5 also includes memory controller 504 connected via a signal and a command interface to a memory 508. The configuration shown in FIG. 5 can be used to balance power consumption and control across memories connected to different memory controllers. In one example, when memory controller 502 receives an indication that memory 508 connected to memory controller 504 is predicted to use a high level of power, the memory controller 502 can request a lower voltage level for its memory 506. In this manner, power for memory controller 502 and memory controller 504 can be managed as a single unit.

Figure 6:
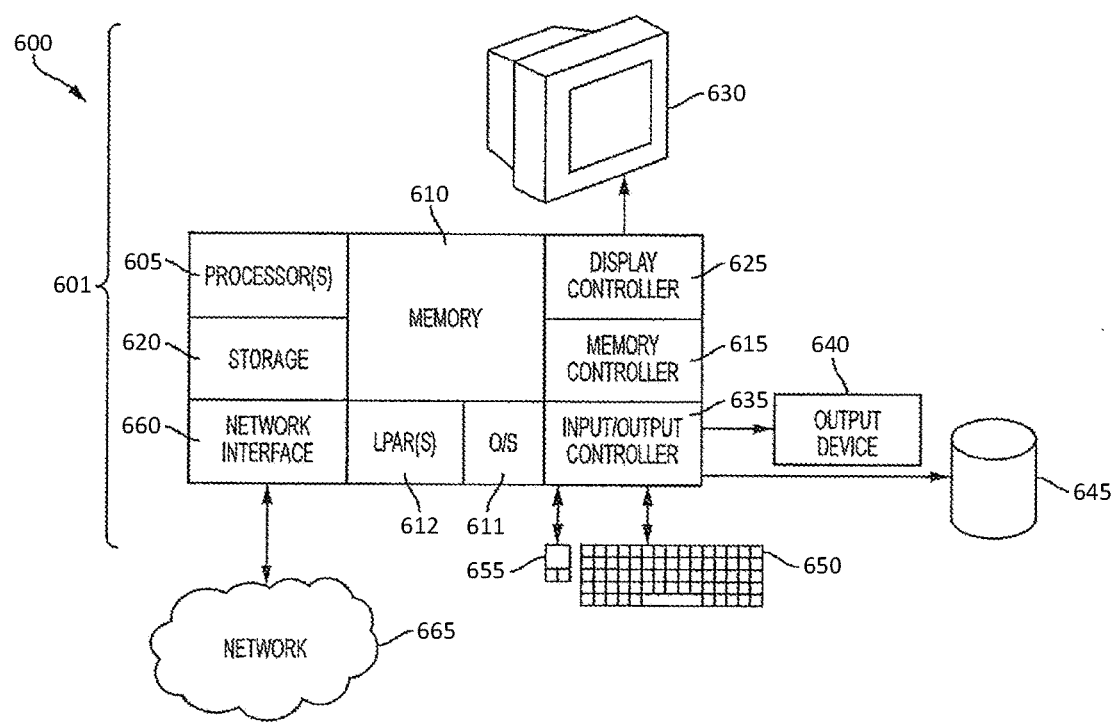
FIG. 6 illustrates a computer system for suggesting adjustments to power management controls based on traffic in accordance with one or more embodiments.

Turning now to FIG. 6, a computer system for suggesting adjustments to power management controls based on traffic is generally shown in accordance with one or more embodiments. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 600 therefore may include general-purpose computer or mainframe 601 capable of running multiple instances of an O/S simultaneously.

In an exemplary embodiment, in terms of hardware architecture, as shown in FIG. 6, the computer 601 includes one or more processors 605, memory 610 coupled to a memory controller 615, and one or more input and/or output (I/O) devices 640, 645 (or peripherals) that are communicatively coupled via a local input/output controller 635. The input/output controller 635 can be, for example but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 635 may include a plurality of sub-channels configured to access the output devices 640 and 645. The sub-channels may include fiber-optic communications ports.

The processor 605 is a hardware device for executing software, particularly that stored in storage 620, such as cache storage, or memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another, but can be accessed by the processor 605.

The instructions in memory 610 may include one or more separate programs, each of which comprises an ordered listing of executable instructions for implementing logical functions. In the example of FIG. 6, the instructions in the memory 610 a suitable operating system (OS) 611. The operating system 611 essentially controls the execution of other computer programs and provides scheduling, input-output control, file and data management, memory management, and communication control and related services.

The memory 610 may include multiple logical partitions (LPARs) 612, each running an instance of an operating system. The LPARs 612 may be managed by a hypervisor, which may be a program stored in memory 610 and executed by the processor 605.

In an exemplary embodiment, a conventional keyboard 650 and mouse 655 can be coupled to the input/output controller 635. Other output devices such as the I/O devices 640, 645 may include input devices, for example but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630. In an exemplary embodiment, the system 600 can further include a network interface 660 for coupling to a network 665. The network 665 can be an IP-based network for communication between the computer 601 and any external server, client and the like via a broadband connection. The network 665 transmits and receives data between the computer 601 and external systems. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the instructions in the memory 610 may further include a basic input output system (BIOS) (omitted for simplicity). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute instructions stored within the memory 610, to communicate data to and from the memory 610, and to generally control operations of the computer 601 pursuant to the instructions.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   viewing contents of a command queue, the contents including commands waiting to be sent in a specified order to a memory for execution at the memory;
   accessing command pattern data that includes patterns of commands, each of the patterns of commands including an associated estimated power consumption;
   tracking a power consumption of commands executing at the memory;
   updating the command pattern data based on the tracking;
   searching the contents of the command queue for the patterns of commands;
   locating one of the patterns of commands in the contents of the command queue;
   determining a suggested power management action for the memory based on the located pattern of commands and its associated estimated power consumption; and
   sending the suggested power management action to a power control engine of the memory, the sending prior to a first command in the located pattern of commands being sent to the memory for execution.

2. The method of claim 1, wherein the suggested power management action is selected from the group consisting of: increase voltage, decrease voltage, and do not adjust voltage.

3. The method of claim 1, wherein the determining is further based on a current power management state of the memory.

4. The method of claim 1, wherein the viewing, accessing, searching, locating, determining, and sending are performed by a memory controller in communication with the memory.

5. The method of claim 4, wherein the method further includes sending a signal to a second memory controller for input into a determining a second suggested power management action for a second memory.

6. The method of claim 1, wherein the tracking is based on data from sensors.

7. The method of claim 1, wherein the suggested power management action is encoded on a signal as one or both of a defined voltage level and a digital code.

8. The method of claim 1, wherein the suggested power management action is passed through to the power control engine via an existing command, address or data signal.

9. A system comprising:
   a first memory having computer readable instructions; and
   a processor for executing the computer readable instructions, the computer readable instructions including:
   viewing contents of a command queue, the contents including commands waiting to be sent in a specified order to a second memory for execution at the second memory;
   accessing command pattern data that includes patterns of commands, each of the patterns of commands including an associated estimated power consumption;
   tracking a power consumption of commands executing at the memory;
   updating the command pattern data based on the tracking;
   searching the contents of the command queue for the patterns of commands;
   locating one of the patterns of commands in the contents of the command queue;
   determining a suggested power management action for the second memory based on the located pattern of commands and its associated estimated power consumption; and
   sending the suggested power management action to a power control engine of the second memory, the sending prior to a first command in the located pattern of commands being sent to the second memory for execution.

10. The system of claim 9, wherein the suggested power management action is selected from the group consisting of: increase voltage, decrease voltage, and do not adjust voltage.

11. The system of claim 9, wherein the determining is further based on a current power management state of the second memory.

12. The system of claim 9, wherein the viewing, accessing, searching, locating, determining, and sending are performed by a memory controller in communication with the second memory.

13. The system of claim 12, wherein the instructions further include sending a signal to a second memory controller for input into a determining a second suggested power management action for a third memory.

14. The system of claim 9, wherein the tracking is based on data from sensors.

15. The system of claim 9, wherein the suggested power management action is passed through to the power control engine via an existing command, address or data signal.

16. A computer program product comprising a non-transitory computer readable storage medium having program instructions embodied therewith, the program instructions executable by processing circuitry to cause the processing circuitry to perform:
   viewing contents of a command queue, the contents including commands waiting to be sent in a specified order to a memory for execution at the memory;
   accessing command pattern data that includes patterns of commands, each of the patterns of commands including an associated estimated power consumption;
   tracking a power consumption of commands executing at the memory;
   updating the command pattern data based on the tracking;
   searching the contents of the command queue for the patterns of commands;
   locating one of the patterns of commands in the contents of the command queue;
   determining a suggested power management action for the memory based on the located pattern of commands and its associated estimated power consumption; and
   sending the suggested power management action to a power control engine of the memory, the sending prior to a first command in the located pattern of commands being sent to the memory for execution.

17. The computer program product of claim 16, wherein the suggested power management action is selected from the group consisting of: increase voltage, decrease voltage, and do not adjust voltage.

18. The computer program product of claim 16, wherein:
   the memory includes a memory device; and
   the viewing, accessing, searching, locating, determining, and sending are performed by a memory controller in communication with the memory.

\* \* \* \* \*